United States Patent
Marles

(10) Patent No.: US 11,753,151 B2
(45) Date of Patent: *Sep. 12, 2023

(54) LANDING GEAR CONTROLLER

(71) Applicant: Airbus Operations Limited, Bristol (GB)

(72) Inventor: David Marles, Bristol (GB)

(73) Assignee: Airbus Operations Limited, Bristol (GB)

( * ) Notice: Subject to any disclaimer, the term of this patent is extended or adjusted under 35 U.S.C. 154(b) by 0 days.

This patent is subject to a terminal disclaimer.

(21) Appl. No.: 17/736,787

(22) Filed: May 4, 2022

(65) Prior Publication Data

US 2022/0258854 A1 Aug. 18, 2022

Related U.S. Application Data

(63) Continuation of application No. 16/009,470, filed on Jun. 15, 2018.

(30) Foreign Application Priority Data

Jun. 16, 2017 (GB) .................... 1709609

(51) Int. Cl.
*B64C 25/26* (2006.01)
*B64C 25/16* (2006.01)
(Continued)

(52) U.S. Cl.
CPC ............ *B64C 25/26* (2013.01); *B64C 25/16* (2013.01); *B64C 25/18* (2013.01); *B64C 25/22* (2013.01); *B64C 25/24* (2013.01); *G05D 3/10* (2013.01)

(58) Field of Classification Search
CPC ......... B64C 25/26; B64C 25/16; B64C 25/18; B64C 25/22; B64C 25/24; G05D 3/10
See application file for complete search history.

(56) References Cited

U.S. PATENT DOCUMENTS 6,129,306 A * 10/2000 Pham ..................... B64C 37/00
244/50
6,854,689 B1 * 2/2005 Lindahl .................. B64C 25/16
244/102 R
(Continued)

FOREIGN PATENT DOCUMENTS

CN 101068713 11/2007
CN 103072687 5/2013
(Continued)

OTHER PUBLICATIONS

European Search Report cited in EP 18177930.7 dated Oct. 18, 2018, 7 pages.

(Continued)

*Primary Examiner* — Justin M Benedik
(74) *Attorney, Agent, or Firm* — Nixon & Vanderhye P.C.

(57) ABSTRACT

A landing gear controller (120) to control extension and retraction of a landing gear for an aircraft, the landing gear controller (120) configured to cause, during an aircraft take-off or landing procedure, a landing gear extension and retraction system (110) to perform only a first portion of a landing gear extension or retraction process, on the basis of a status of the aircraft and prior to receiving a command for the landing gear to be extended or retracted.

20 Claims, 5 Drawing Sheets

(51) Int. Cl.
*G05D 3/10* (2006.01)
*B64C 25/22* (2006.01)
*B64C 25/24* (2006.01)
*B64C 25/18* (2006.01)

(56) References Cited

U.S. PATENT DOCUMENTS

| | | | |
|---|---|---|---|
| 7,475,849 B2* | 1/2009 | Lindahl | B64C 25/16 244/102 R |
| 7,810,755 B2* | 10/2010 | Reynes | F15B 13/0842 244/102 R |
| 8,191,827 B2 | 6/2012 | Reynes | |
| 8,684,306 B2* | 4/2014 | Martin | B64C 25/26 244/102 SL |
| 8,807,480 B2* | 8/2014 | Frank | B64C 25/26 244/102 R |
| 9,102,402 B2 | 8/2015 | Dubois | |
| 9,517,837 B2* | 12/2016 | Lecourtier | B64C 25/20 |
| 2003/0011493 A1* | 1/2003 | Wiplinger | B64C 25/28 340/960 |
| 2006/0293805 A1 | 12/2006 | Garcia | |
| 2008/0035790 A1 | 2/2008 | Bryant | |
| 2008/0277525 A1 | 11/2008 | Reynes | |
| 2013/0060404 A1* | 3/2013 | Cahill | B60T 17/221 701/3 |
| 2015/0122945 A1* | 5/2015 | Kavounas | B64C 25/30 244/102 R |
| 2015/0144735 A1* | 5/2015 | Lecourtier | B64C 25/16 244/102 R |
| 2016/0129996 A1 | 5/2016 | Boucher et al. | |
| 2016/0363177 A1 | 12/2016 | Samie | |
| 2018/0362151 A1* | 12/2018 | Marles | B64C 25/26 |

FOREIGN PATENT DOCUMENTS

| | | |
|---|---|---|
| CN | 104648659 | 5/2015 |
| FR | 3001708 | 11/2007 |

OTHER PUBLICATIONS

China Notice Of Intent To Grant Patent Application (dated Jun. 1, 2023)(7 pages).

* cited by examiner

LANDING GEAR CONTROLLER

RELATED APPLICATIONS

This is a continuation application of U.S. patent application Ser. No. 16/009,470, filed Jun. 15, 2018, which claims priority to United Kingdom Patent Application GB1709609.0 filed Jun. 16, 2017, the entirety of each of these applications are incorporated by reference.

TECHNICAL FIELD

The present invention relates to a landing gear controller, to a system comprising the landing gear controller and a landing gear extension and retraction system, to a method to extend or retract a landing gear of an aircraft during an aircraft take-off or landing procedure, and to an aircraft.

BACKGROUND

In many known aircraft, a landing gear of the aircraft is held in an extended position when the aircraft is on the ground, and is retracted to a stowed position once the aircraft has taken off. The landing gear subsequently is extended to the extended position again before the aircraft lands. Movement of the landing gear between the stowed position and the extended position is typically controlled by a pilot using cockpit controls of the aircraft, such as a landing gear lever.

SUMMARY

A first aspect of the present invention provides a landing gear controller to control extension and retraction of a landing gear of an aircraft, the landing gear controller configured to cause, during an aircraft take-off or landing procedure, a landing gear extension and retraction system to perform only a first portion of a landing gear extension or retraction process, on the basis of a status of the aircraft and prior to receiving a command for the landing gear to be extended or retracted.

Optionally, the landing gear controller is configured to receive the command from cockpit controls of the aircraft.

Optionally, the landing gear controller is configured, on the basis of the command, to cause the landing gear extension and retraction system to perform a second portion of the landing gear extension or retraction process. The second portion may be a remainder of the landing gear extension or retraction process.

Optionally, the first portion of the landing gear extension or retraction process comprises one or more functions involving avionics.

Optionally, the landing gear controller is configured to cause a landing gear bay door to move from a closed position towards an open position during the second portion of the landing gear extension or retraction process, wherein the landing gear bay door is associated with a landing gear to which the landing gear extension and retraction system is operatively connected.

Optionally, the status of the aircraft comprises one or more of: ground speed, amount of lift, aircraft angle, absolute altitude, true altitude, landing gear strut length, and aircraft rotation.

Optionally, the landing gear controller is configured to cause, during the aircraft take-off procedure, the landing gear extension and retraction system to perform the first portion of the landing gear extension or retraction process when the aircraft is on the ground. Alternatively, the landing gear controller may be configured to cause, during the aircraft take-off procedure, the landing gear extension and retraction system to perform the first portion of the landing gear extension or retraction process during rotation of the aircraft or during initial climb of the aircraft after lift-off from the ground.

Optionally, the landing gear controller is configured to cause, during the aircraft take-off procedure, the landing gear extension and retraction system to perform the first portion of the landing gear retraction process, on the basis of a detection that a length of a landing gear strut has increased, during the aircraft take-off procedure, to above a predetermined threshold length, the landing gear strut being a strut of a landing gear to which the landing gear extension and retraction system is operatively connected.

Optionally, the predetermined threshold length is less than a maximum length to which the strut is extendable when the aircraft is off the ground.

A second aspect of the present invention provides an aircraft landing gear system, comprising: a landing gear extension and retraction system; and the landing gear controller according to the first aspect of the present invention, wherein the landing gear controller is operatively connected to the landing gear extension and retraction system.

Optionally, the landing gear controller has any one or more of the features discussed above as optional in the landing gear controller of the first aspect of the present invention.

Optionally, the aircraft landing gear system comprises: a landing gear bay door; a landing gear bay door lock to retain the landing gear bay door in a closed position when locked; and a landing gear bay door actuator to move the landing gear bay door between the closed position and an open position relative to a door frame; and the first portion of the landing gear extension or retraction process comprises the landing gear extension and retraction system causing: actuation of the landing gear bay door actuator to positively hold the landing gear bay door in a closed position; and unlocking of the landing gear bay door lock to permit movement of the landing gear bay door to the open position.

Optionally, the aircraft landing gear system comprises: a landing gear lock to retain the landing gear in position when stowed or extended, and a landing gear actuator to move the landing gear between extended and stowed positions; and the first portion of the landing gear extension or retraction process comprises the landing gear extension and retraction system causing: actuation of the landing gear actuator to positively hold the landing gear in an extended or stowed position, and unlocking of the landing gear lock to permit movement of the landing gear to the stowed or extended position, respectively.

Optionally, the aircraft landing gear system comprises an isolator for isolating the landing gear extension and retraction system from a power supply. The landing gear controller may be configured to cause, during the aircraft take-off or landing procedure and prior to receiving the command, operation of the isolator to supply power to the landing gear extension and retraction system.

Optionally, the isolator may be an isolation valve, and the operation of the isolation valve may comprise opening of the isolation valve.

A third aspect of the present invention provides a method to extend or retract a landing gear of an aircraft during an aircraft take-off or landing procedure, the method comprising: on the basis of a status of the aircraft, causing performance of only a first portion of a process for extending or retracting the landing gear; and then receiving a command for the landing gear to be extended or retracted.

Optionally, the method comprises maintaining a closed state of a landing gear bay door until after the receiving of the command, wherein the landing gear bay door is a door of a landing gear bay for accommodating the landing gear.

Optionally, the first portion of the process involves the use of avionics of the aircraft.

Optionally, the method comprises, during the aircraft take-off procedure, causing performance of only a first portion of a process for retracting the landing gear on the basis of a detection that a length of a landing gear strut has increased, during the aircraft take-off procedure, to above a predetermined threshold length, the landing gear strut being a strut of a landing gear to which the landing gear extension and retraction system is operatively connected.

Optionally, the predetermined threshold length is less than a maximum length to which the strut is extendable when the aircraft is off the ground.

A fourth aspect of the present invention provides a non-transitory computer-readable storage medium storing instructions that, if executed by a processor of a landing gear controller, cause the processor to carry out the method according to the third aspect of the present invention.

A fifth aspect of the present invention provides a landing gear controller configured to cause, during an aircraft take-off or landing procedure, an aircraft system to begin a process for extending or retracting a landing gear and an aerodynamic profile of a fuselage of the aircraft to be maintained, before receiving a command from aircraft cockpit controls for the landing gear to be extended or retracted.

A sixth aspect of the present invention provides an aircraft, comprising one or more of: the landing gear controller according to the first aspect or the fifth aspect of the present invention, the aircraft landing gear system according to the second aspect of the present invention, and the non-transitory computer-readable storage medium according to the fourth aspect of the present invention.

It is to be noted that, herein, the phrase "between the open position and the closed position" covers movement from the open position to the closed position, and movement from the closed position to the open position. In some embodiments, the movement is from the open position to the closed position, and in other embodiments the movement is from the closed position to the open position. Similarly, herein, the phrase "between the stowed position and the extended position" covers movement from the stowed position to the extended position, and movement from the extended position to the stowed position. In some embodiments, the movement is from the stowed position to the extended position, and in other embodiments the movement is from the extended position to the stowed position.

DRAWINGS

Embodiments of the present invention will now be described, by way of example only, with reference to the accompanying drawings, in which.

DETAILED DESCRIPTION

An aircraft landing gear can influence aircraft performance, particularly during aircraft take-off when the landing gear is in an extended position. In the extended position, the landing gear increases aircraft drag, which can reduce, for example, the climb rate of the aircraft during take-off.

Decreasing the time taken to retract the landing gear can therefore help to reduce aircraft drag during a take-off procedure, which in turn can help to allow an increase in a maximum take-off weight of the aircraft.

Typically, retraction or extension of a landing gear is initiated by a pilot operating aircraft cockpit controls. Operation of the aircraft cockpit controls causes a landing gear extension and retraction system of the aircraft to extend or retract the landing gear(s) of the aircraft. During a take-off procedure, the pilot will typically manually initiate a landing gear retraction process upon confirming, for example, a positive rate of aircraft climb. This initiation may be achieved by the pilot moving a landing gear lever in the cockpit.

Embodiments of the present invention are concerned with performing a first portion of a landing gear extension or retraction process before a pilot requests that the landing gear be extended or retracted. Despite this, in embodiments of the present invention, authority for actually extending or retracting the landing gear remains with the pilot.

Figure 1:
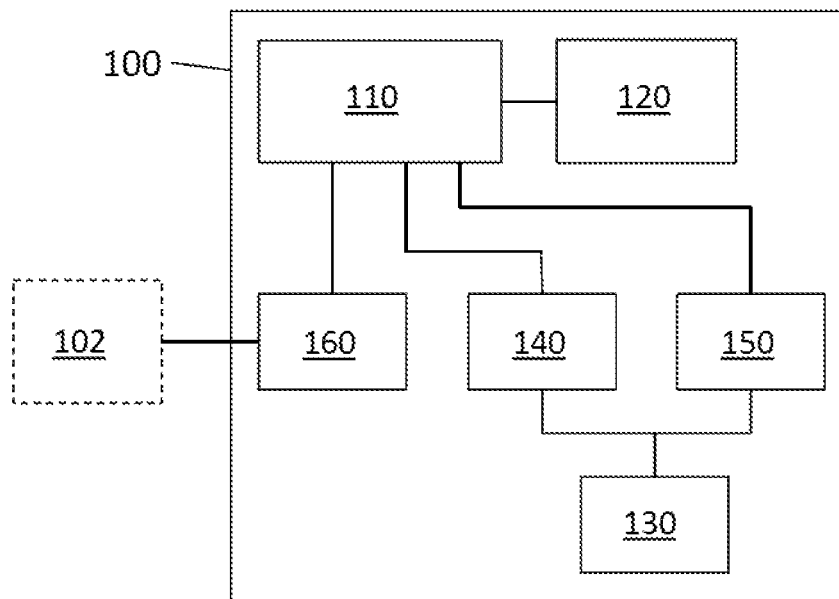
FIG. 1 is a schematic view of an example of a system according to an embodiment of the present invention.

FIG. 1 shows a schematic view of an example of an aircraft landing gear system 100 according to an embodiment of the present invention. The aircraft landing gear system 100 comprises a landing gear extension and retraction system 110 for an aircraft and a landing gear controller 120 operatively connected to the landing gear extension and retraction system 110.

In this embodiment, the aircraft landing gear system 100 comprises a landing gear bay door 130, a landing gear bay door lock 140 to retain the landing gear bay door 130 in a closed position when locked, and a landing gear bay door actuator 150 to move the landing gear bay door 130 between the closed position and an open position relative to a door frame. The landing gear bay door 130 is associated with a landing gear (not shown in FIG. 1) to which the landing gear extension and retraction system 110 is operatively connected. That is, the landing gear bay door 130 is a door of a landing gear bay for accommodating the landing gear. The landing gear is movable by the landing gear extension and retraction system 110 between an extended position and a stowed position. In the stowed position, the landing gear is positioned in the landing gear bay. An opening of the landing gear bay is covered or blocked by the landing gear bay door when the landing gear bay door is in the closed position. The landing gear to which the landing gear bay door 130 is associated comprises a strut on which the one or more wheels of the landing gear are mounted. The strut may comprise a shock absorber to dampen vertical oscillations and to cushion the impact of aircraft landing, as is known in the art. When the aircraft is on the ground, the strut is in a ground state in which the strut is at least partially compressed and so has a first length. When the aircraft is in-flight, the strut is in a flight state in which the strut is at least partially lengthened compared to the ground state and so has a second length, the second length being longer than the first length. The strut moves from the ground state to the flight state during an aircraft take-off procedure. That is, the strut lengthens as the aircraft takes off.

In this embodiment, the aircraft landing gear system 100 comprises an isolator 160 for isolating the landing gear extension and retraction system 110 from a power supply 102. In this embodiment, the isolator 160 is an isolation valve 160. In this embodiment, the landing gear extension and retraction system 110 is a hydraulic system and the power supply 102 is another aircraft hydraulic system 102. The other aircraft hydraulic system 102 may be a centralised aircraft hydraulic system. The isolation valve 160 isolates the landing gear extension and retraction system 110 from the other aircraft hydraulic system 102 when the isolation valve 160 is in a closed position. The isolation valve 160 permits the flow of hydraulic fluid from the other aircraft hydraulic system 102 to the landing gear extension and retraction system 110 when the isolation valve is in an open position. In other embodiments, the landing gear extension and retraction system 110 may be an electric or electro-mechanical system and the isolator 160 may be an electrical switch or other appropriate device configured to control the supply of electric power from a power supply to the landing gear extension and retraction system 110. In some embodiments, the isolator 160 may be omitted. For instance, the landing gear extension and retraction system 110 may be permanently connected to the power supply 102.

The landing gear controller 120 is to control the landing gear extension and retraction system 100. The landing gear controller 120 is configured to cause, during an aircraft take-off or landing procedure, the landing gear extension and retraction system 110 to perform only a first portion of a landing gear extension or retraction process, on the basis of a status of the aircraft and prior to receiving a command for the landing gear to be extended or retracted. The landing gear extension or retraction process is a process for extending or retracting one or more landing gear of the aircraft. In some embodiments, the status of the aircraft comprises one or more of: ground speed, amount of lift, aircraft angle, absolute altitude, true altitude, landing gear strut length, and aircraft rotation.

In some embodiments, the command is received from aircraft cockpit controls of the aircraft. The aircraft cockpit controls may be operated by a pilot of the aircraft.

In this embodiment, the landing gear controller 120 is configured, on the basis of the command, to cause the landing gear extension and retraction system to perform a second portion of the landing gear extension or retraction process. The second portion of the landing gear extension or retraction process may be a remainder of the landing gear extension or retraction process. That is, the landing gear extension or retraction process may consist of the first and second portions. In this embodiment, the landing gear controller 120 is configured to cause the landing gear bay door 130 to move from the closed position towards the open position as part of the second portion of the landing gear extension or retraction process.

By performing the first portion of the landing gear extension or retraction process before receiving the command, the period of time between the controller 120 receiving the command and the landing gear extension and retraction system 110 completing the landing gear extension or retraction process can be reduced. This can lead to one or more of the advantages discussed above.

In some embodiments, the first portion of the landing gear extension or retraction process comprises one or more functions involving avionics of the aircraft. In some embodiments, the avionics function to check on the state of one or more components of the landing gear extension and retraction system 110. In some embodiments, the avionics of the aircraft may be configured to control one or more components of the landing gear extension and retraction system 110, for example the landing gear bay door lock 140. In some embodiments, the landing gear bay door actuator 150, or any other actuator in the system 100, is an electric actuator controlled by avionics of the aircraft or a hydraulic actuator controlled by avionics of the aircraft. Functions involving avionics of the aircraft can cause latency in a process. For instance, hydraulic or electrical valves or switches take time to respond to avionic signals. Some embodiments of the present invention help to reduce this latency by performing one or more functions involving avionics of the aircraft before receiving the command.

In this embodiment, the first portion of the landing gear extension or retraction process comprises the landing gear extension and retraction system 110 causing: actuation of the landing gear bay door actuator 150 to positively hold the landing gear bay door 130 in a closed position, and unlocking of the landing gear bay door lock 140 to permit movement of the landing gear bay door 130 to the open position. In some embodiments, this actuation of the landing gear bay door actuator 150 is performed before the unlocking of the landing gear bay door lock 140.

In some embodiments, the aircraft landing gear system 100 comprises a landing gear lock to retain the landing gear in position when stowed or extended (not shown in FIG. 1), and a landing gear actuator to move the landing gear between extended and stowed positions (not shown in FIG. 1). In some of these embodiments, the first portion of the landing gear extension or retraction process comprises the landing gear extension and retraction system 110 causing: actuation of the landing gear actuator to positively hold the landing gear in an extended or stowed position, and unlocking of the landing gear lock to permit movement of the landing gear to the stowed or extended position, respectively. In some embodiments, this actuation of the landing gear actuator is performed before the unlocking of the landing gear lock.

In some embodiments, the landing gear controller 120 is configured to cause, during the aircraft take-off or landing procedure and prior to receiving the command, operation of the isolator 160 to supply power to the landing gear extension and retraction system 110. This operation of the isolator 160 may be caused before the actuation of the landing gear bay door actuator 150. Indeed, in some embodiments, the landing gear bay door actuator 150 and the landing gear bay door lock 140 may rely on the supply of power from the power supply 102 in order to be operable.

In some embodiments, the landing gear controller 120 is configured, during the aircraft take-off procedure, to cause the landing gear extension and retraction system 110 to perform the first portion of the process when the aircraft is on the ground, such as on a runway. The aircraft may be stationary on the ground or moving along the ground.

Determination that the aircraft is on the ground may be achieved using any known technique in the art.

A measurement of landing gear strut length can be used to detect, before the aircraft has left the ground, when aircraft take-off has commenced. The strut may lengthen compared to the ground state when the wheels of the aircraft are still on the ground and only a portion of the weight of the aircraft is being lifted by the wings. In some instances, the strut has a pre-load, and therefore does not compress upon landing until the force on the strut exceeds the pre-load. Therefore, the strut may reach the flight state when the wheels of the aircraft are still on the ground and only a portion of the weight of the aircraft is being lifted by the wings. In some embodiments, the flight state is a fully lengthened state of the strut.

The landing gear controller 120 may be configured to cause, during an aircraft take-off procedure, the landing gear extension and retraction system 110 to perform the first portion of the landing gear retraction process, on the basis of a detection that a length of a landing gear strut has increased, during the aircraft take-off procedure, to above a predetermined threshold length. The predetermined threshold may be a strut length that indicates that aircraft take-off has commenced. In some embodiments, the predetermined threshold is an only partial lengthening of the strut compared to the ground state. In some embodiments, the predetermined threshold is a full lengthening of the strut. In some embodiments, the landing gear strut is comprised in a nose landing gear. In some embodiments, the landing gear strut is comprised in a main landing gear.

In some embodiments, the landing gear controller 120 may be configured to receive a signal from a strut sensor (not shown), the signal indicating the length of the strut, to compare the signal to a predetermined threshold and to cause, during an aircraft take-off procedure, the landing gear extension and retraction system 110 to perform the first portion of the landing gear retraction process, on the basis of detecting that the landing gear strut exceeding a predetermined threshold and prior to receiving a command for the landing gear to be retracted.

In some embodiments, the controller is configured to perform the first portion of the landing gear extension and retraction process in response to detecting that a length of one or more or all landing gear struts of an aircraft has exceeded a predetermined threshold. For example, the controller may be configured to perform the first portion of the landing gear extension and retraction process in response to detecting that a length of a landing gear strut associated with a nose landing gear of the aircraft has exceeded a predetermined nose strut threshold.

In some embodiments, the landing gear controller 120 is configured, during the aircraft take-off procedure, to cause the landing gear extension and retraction system 110 to perform the first portion of the process during rotation of the aircraft or during initial climb of the aircraft after lift-off from the ground.

In some embodiments, the second portion of the landing gear extension or retraction process comprises the landing gear extension and retraction system 110 causing opening of the landing gear bay door 130. That is, a closed state of the landing gear bay door 130 may be maintained until after the landing gear controller 120 has received the command.

In some embodiments, the landing gear controller 120 is configured to cause, during the aircraft take-off or landing procedure, an aircraft system (such as the landing gear extension and retraction system 110) to begin the landing gear extension or retraction process, and an aerodynamic profile of a fuselage of the aircraft to be maintained, before receiving the command for the landing gear to be extended or retracted. As noted previously, the command may be received at the landing gear controller 120 from the aircraft cockpit controls. This maintenance of the aerodynamic profile of the fuselage may comprise maintaining a closed state of the landing gear bay door 130, and helps to reduce the degree of drag acting on the aircraft as compared to when the landing gear bay door 130 is open.

Figure 2:
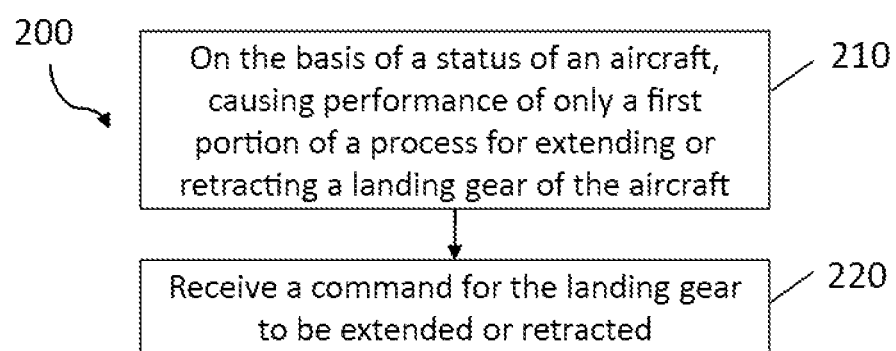
FIG. 2 is a flow diagram showing an example of a method according an embodiment of the present invention.

The present invention also provides a method to extend or retract a landing gear of an aircraft during an aircraft take-off or landing procedure. FIG. 2 is a flow diagram showing an example of a method 200 according an embodiment of the present invention. The method 200 of this embodiment comprises: on the basis of a status of the aircraft, causing 210 performance of only a first portion of a process for extending or retracting the landing gear; and then receiving 220 a command for the landing gear to be extended or retracted. In some embodiments, the method 200 comprises maintaining a closed state of a landing gear bay door until after receiving 220 the command. In some embodiments, the first portion of the process involves the use of avionics of the aircraft. The method 200 may be performed by a landing gear controller, such as the landing gear controller 120 of any one of the embodiments discussed above. The command may be received at the landing gear controller from aircraft cockpit controls of the aircraft.

Figure 3:
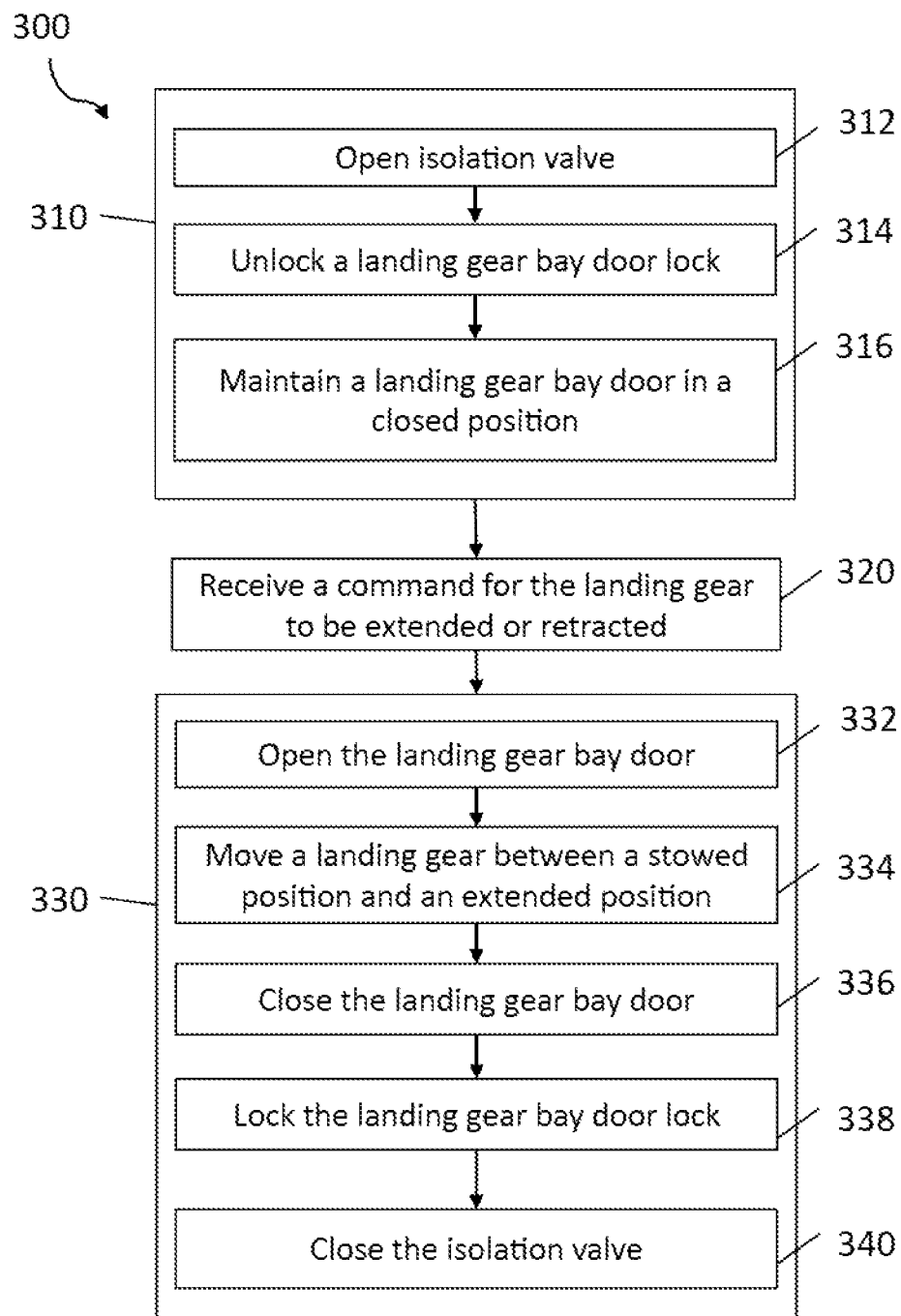
FIG. 3 is a flow diagram showing an example of another method according an embodiment of the present invention.

FIG. 3 is a flow diagram showing an example of another method 300 to extend or retract a landing gear of an aircraft during an aircraft take-off or landing procedure, according an embodiment of the present invention. The method 300 of this embodiment comprises: on the basis of a status of the aircraft, causing 310 performance of only a first portion 310 of a process for extending or retracting the landing gear, then receiving 320 a command for the landing gear to be extended or retracted, and then, on the basis of the command, causing 330 performance of a second portion of the process for extending or retracting the landing gear. Again, the method 300 may be performed by a landing gear controller, such as the landing gear controller 120 of any one of the embodiments discussed above, and the command may be received at the landing gear controller from aircraft cockpit controls of the aircraft.

In this embodiment, the first portion of the process for extending or retracting the landing gear comprises the following operations: operating 312 an isolator (such as opening the isolation valve 160 discussed above), unlocking 314 a landing gear bay door lock (such as the lock 140 discussed above), and maintaining 316 a landing gear bay door (such as the door 130 discussed above) in a closed position. These operations 312, 314, 316 may be carried out in the order presented. In other examples, the first portion of the process may comprise only one, or a combination of some, of these operations 312, 314, 316.

In this example, the second portion of the process for extending or retracting the landing gear comprises the following operations: opening 332 the landing gear bay door, moving 334 the landing gear between a stowed position and an extended position, closing 336 the landing gear bay door, locking 338 the landing gear bay door lock to retain the landing gear bay door in a closed position, and operating 340 the isolator (such as closing the isolation valve 160 discussed above). These operations 332, 334, 336, 338, 340 may be carried out in the order presented. In other examples, the second portion of the process may comprise only one, or a combination of some, of these operations 332, 334, 336, 338, 340.

Either of the methods 200, 300 described above with reference to FIG. 2 and FIG. 3, respectively, may be implemented by one of the aircraft landing gear systems described above, such as system 100 illustrated in FIG. 1.

Figure 4:
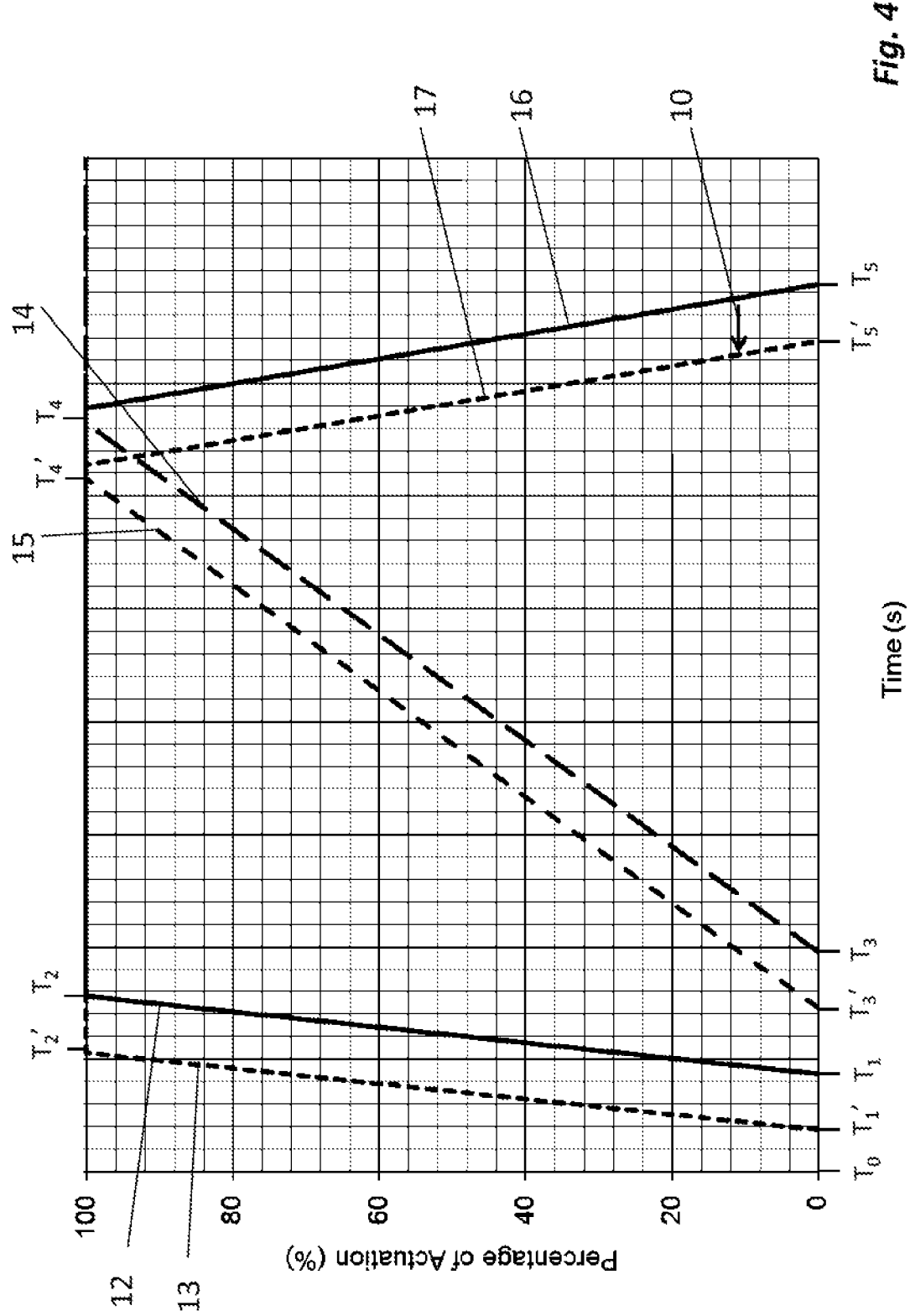
FIG. 4 is a graph showing an aircraft landing gear extension or retraction process implemented in an embodiment of the present invention and an aircraft landing gear extension or retraction process of a comparative example.

FIG. 4 shows a graph that demonstrates the time saved in extending or retracting a landing gear by implementation of an embodiment of the present invention, as compared to a comparative example.

In the comparative example, a pilot requested extension or retraction of the landing gear at time $T_0$ by generating a command for the landing gear to be extended or retracted. In this comparative example, opening of a landing gear bay door is started in response to the command at time $T_1$ and completed at time $T_2$, as denoted by line 12. When the landing gear bay door has been moved to an open position, extension or retraction of the landing gear is started at time $T_3$ and completed at time $T_4$, as denoted by line 14. Closing of the landing gear bay door is started after the landing gear has reached the respective extended or stowed position, and the landing gear bay door is fully closed at time $T_5$, as denoted by line 16. Thus, extending or retracting the landing gear in response to the command takes time $T_5$ from time $T_0$, in this comparative example.

In the example of an implementation of the present invention shown in FIG. 4, the pilot generates a command to extend or retract the landing gear at time $T_0$. Since a first portion of the landing gear extension or retraction process has been performed before time $T_0$, opening the landing gear bay door in response to the command is started earlier than in the comparative example. That is, in this embodiment, opening of the landing gear bay door is started at time $T_1'$ and completed at time $T_2'$, as denoted by line 13. Time $T_1'$ is closer to time $T_0$ than time $T_1$ by an amount of time saved 10. In this embodiment, the time taken to move the landing gear bay door from a closed position to an open position is the same as in the comparative example. Therefore, time $T_2'$ is also closer to time $T_0$ than time $T_2$ by the amount of time saved 10. When the landing gear bay door has been moved to the open position, extension or retraction of the landing gear is started at time $T_3'$ and completed at time $T_4'$, as denoted by line 15. Closing of the landing gear bay door is started after the landing gear has reached the respective extended or stowed position, and the landing gear bay door is fully closed at time $T_5'$, as denoted by line 17. It will be seen that each movement of the landing gear bay door and the landing gear within the landing gear extension or retraction process is therefore started and completed earlier than in the comparative example by the amount of time saved 10, as denoted by lines 15 and 17 of FIG. 4. Thus, extending or retracting the landing gear in response to the command takes time $T_5'$ from time $T_0$, in this embodiment, which is a shorter period of time than the time required in the comparative example by the amount of time saved 10.

The reduction in time taken to extend or retract the landing gear in response to the command achieved by embodiments of the present invention helps to reduce the drag caused by the landing gear when extended. In embodiments of the present invention, a landing gear is moved to a stowed position in a shorter period of time from when a pilot commands the landing gear to be retracted, as compared to a comparative example. This can help to improve the climb performance of the aircraft, which in turn can help to allow an increase in the maximum take-off weight of the aircraft, as discussed above.

Figure 5:
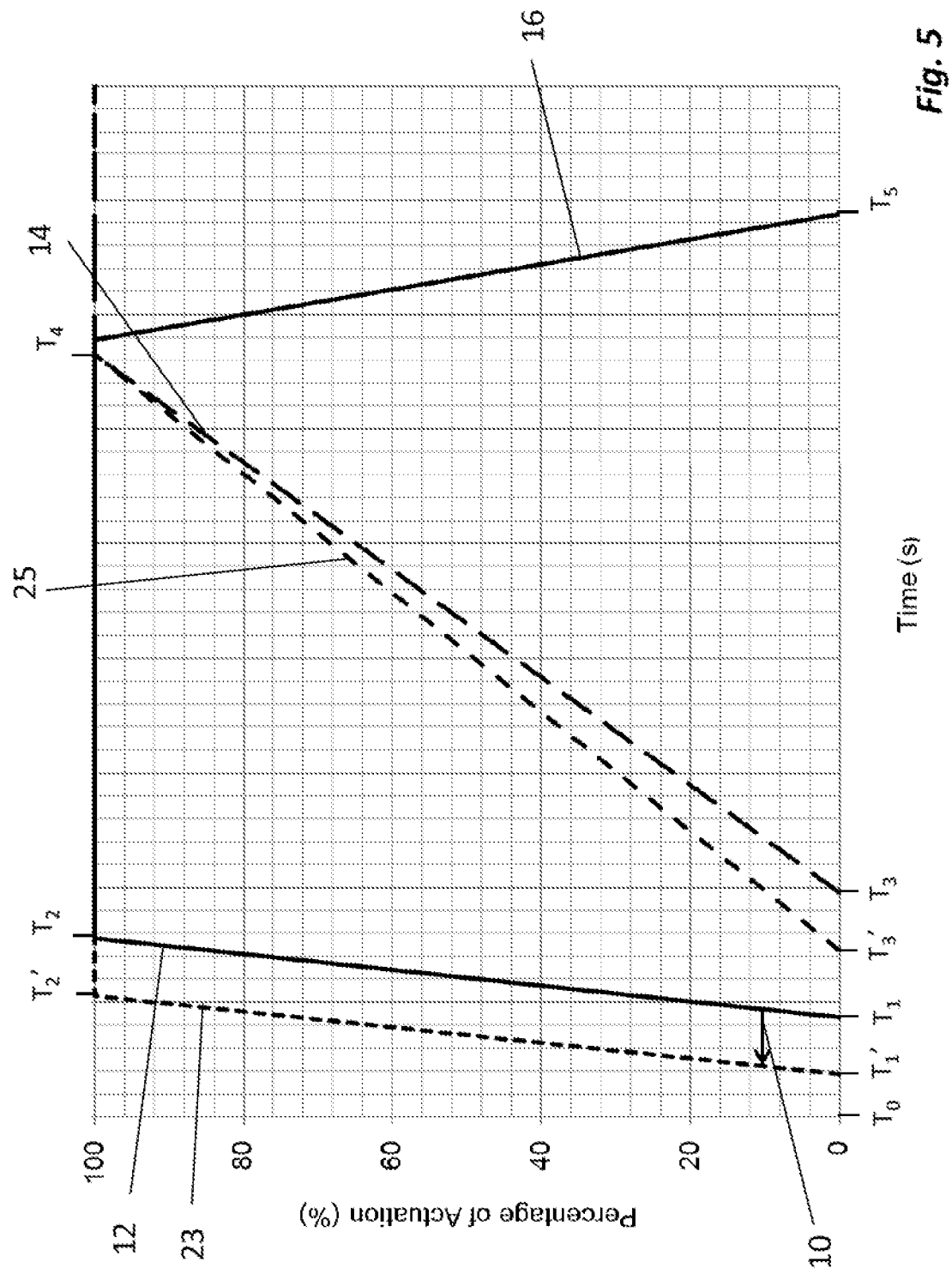
FIG. 5 is a graph showing an aircraft landing gear extension or retraction process implemented in another embodiment of the present invention and an aircraft landing gear extension or retraction process of another comparative example.

In other embodiments, the present invention can be implemented to allow a slower extension or retraction of the landing gear, whilst taking the same overall time $T_5$ to deploy or stow the landing gear in response to a command as in a comparative example, as shown by way of example in FIG. 5. The comparative example shown in FIG. 5 is the same as the comparative example shown in FIG. 4 and described with reference to FIG. 4.

In the embodiment of the present invention represented in FIG. 5, the pilot generates a command to extend or retract the landing gear at time $T_0$. Since a first portion of the landing gear extension or retraction process has been performed before time $T_0$, opening the landing gear bay door in response to the command is started earlier than in the comparative example. That is, in this embodiment, opening the landing gear bay door is started at time $T_1'$ and completed at time $T_2'$, as denoted by line 23. Time $T_1'$ is closer to time $T_0$ than time $T_1$ by an amount of time saved 10. The time taken to move the landing gear bay door from a closed position to an open position is the same in the comparative example and in this embodiment. Therefore, time $T_2'$ is also closer to time $T_0$ than time $T_2$ by the amount of time saved 10. When the landing gear bay door has been moved to the open position, extension or retraction of the landing gear is started at time $T_3'$ and completed at time $T_4$, as denoted by line 25. That is, extending or retracting the landing gear in this embodiment takes a longer period of time than in the comparative example, by the amount of time saved 10. In other embodiments, extending or retracting the landing gear may take a longer period of time than in the comparative example, and yet there may still be time saved in completing the overall process as measured from time $T_0$. In this embodiment, closing of the landing gear bay door is started after the landing gear has reached the respective extended or stowed position, and the landing gear bay door is fully closed at time $T_5$, as denoted by line 16. Thus, the full process of deploying or stowing the landing gear in response to the command takes time $T_5$ from time $T_0$ in both this embodiment and in the comparative example. However, by implementing an embodiment of the present invention, permitting the extending or retracting of the landing gear to take a longer period of time than in the comparative example can help to reduce the demand on the landing gear extension and retraction system that is used to move the landing gear. Additionally or alternatively, this can help to reduce the demand on a power source that powers the landing gear extension and retraction system that is used to move the landing gear. Therefore, embodiments of the present invention potentially allow a smaller and/or lighter landing gear extension and retraction system and/or power system to be provided on the aircraft. In other embodiments, a similar principle could be applied to reduce the speed of movement of the landing gear bay door between the open position and the closed position.

Figure 6:
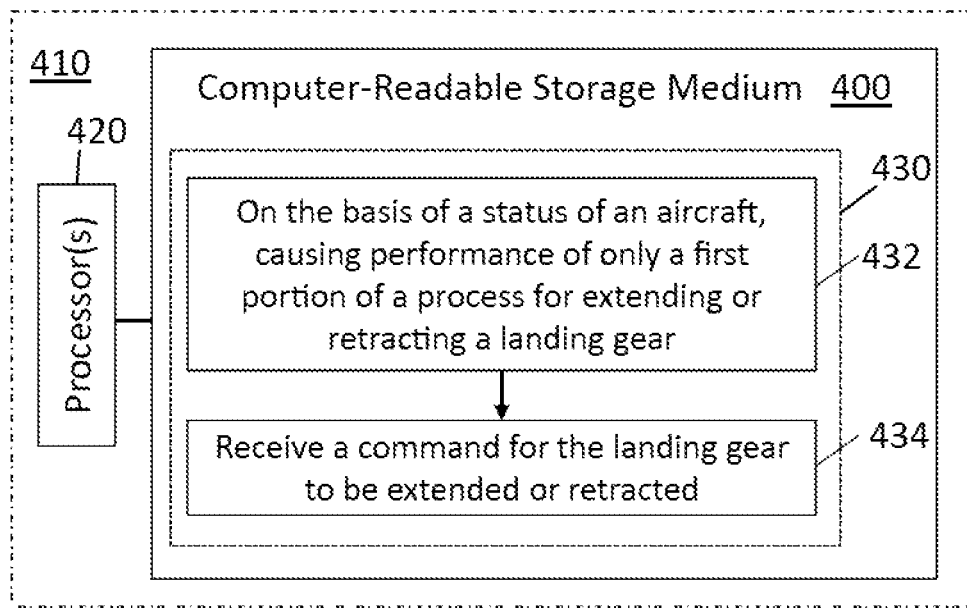
FIG. 6 is a schematic diagram of an example of a non-transitory computer-readable storage medium according an embodiment of the present invention.

FIG. 6 shows a schematic diagram of a non-transitory computer-readable storage medium 400 according to an embodiment of the present invention. The non-transitory computer-readable storage medium 400 stores instructions 430 that, if executed by a processor 420 of a controller 410, cause the processor 420 to perform a method according to an embodiment of the present invention. In some embodiments, the controller 410 is the landing gear controller 120 as described above with reference to FIG. 1. The instructions 430 comprise: on the basis of a status of an aircraft, causing 432 performance of only a first portion of a process for extending or retracting a landing gear, and then receiving 434 a command for the landing gear to be extended or retracted. The instructions 430 may comprise instructions to perform the operations of one of the methods 200, 300 described above with reference to FIG. 2 and FIG. 3, respectively.

Figure 7:
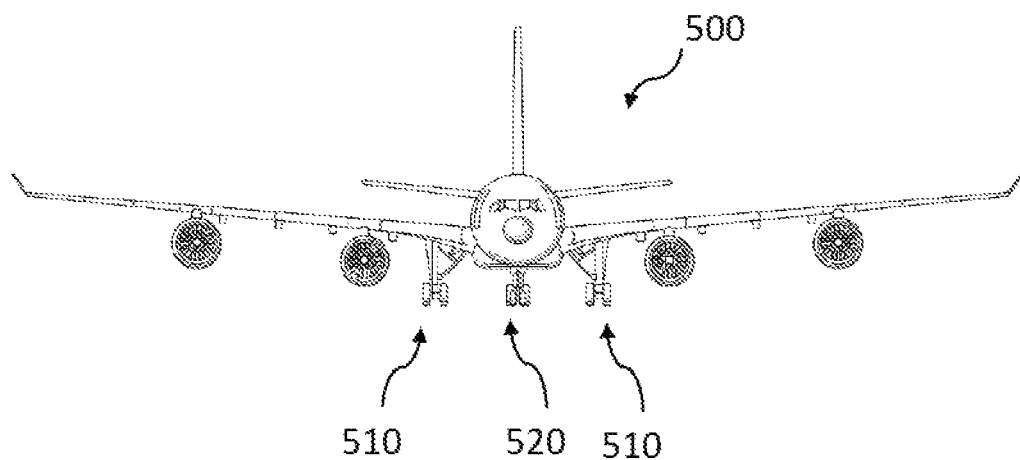
FIG. 7 is a schematic front view of an example of an aircraft according to an embodiment of the present invention.

FIG. 7 shows a schematic diagram of an aircraft 500 in accordance with an embodiment of the present invention. In this embodiment, the aircraft 500 comprises two main landing gears 510 and a nose landing gear 520. The aircraft 500 also comprises the non-transitory computer-readable storage medium 400 (not shown) discussed above with reference to FIG. 6. The aircraft 500 also comprises the landing gear system 100 (not shown) discussed above with reference to FIG. 1. In some embodiments, the landing gear system 100 is common to all of the landing gears 510, 520. In other embodiments, the aircraft 500 has a plurality of the landing gear systems 100, such as one for each of the landing gears 510, 520. The aircraft 500 also has a power supply (not shown) to which the landing gear extension and retraction system 110 of the landing gear system 100 may be selectively connected by appropriate operation of the isolator, as discussed above.

It is to noted that the term "or" as used herein is to be interpreted to mean "and/or", unless expressly stated otherwise.

The above embodiments are to be understood as non-limiting illustrative examples of how the present invention, and aspects of the present invention, may be implemented. Further examples of the present invention are envisaged. It is to be understood that any feature described in relation to any one embodiment may be used alone, or in combination with other features described, and may also be used in combination with one or more features of any other of the embodiments, or any combination of any other of the embodiments. Furthermore, equivalents and modifications not described above may also be employed without departing from the scope of the present invention, which is defined in the accompanying claims.

The invention claimed is:

1. An aircraft landing gear system, comprising:
a landing gear;
a landing gear retraction system configured to retract the landing gear;
a landing gear bay door;
a landing gear bay door actuator configured to move the landing gear bay door between a closed position and an open position relative to a door frame;
a landing gear controller configured, during an aircraft take-off procedure, to cause the landing gear retraction system to perform only a first portion of a landing gear retraction process, wherein the landing gear controller responds to a status of the aircraft to cause the performance of the first portion and cause the performance of the first portion before receiving a command to retract the landing gear,
wherein the first portion of the landing gear retraction process includes the landing gear retraction system actuating the landing gear bay door actuator to positively hold the landing gear bay door in the closed position until at least the command is received.

2. The aircraft landing gear system of claim 1, wherein the landing gear controller is further configured to cause the landing gear retraction system to perform a second portion of the landing gear retraction process after receiving the command to retract the landing gear, and
wherein the second portion includes the landing gear controller causing the landing gear bay door actuator to move the landing gear bay door from the closed position towards the open position.

3. The aircraft landing gear system of claim 1, wherein the first portion of the landing gear retraction process comprises one or more functions involving avionics.

4. The aircraft landing gear system of claim 1, wherein the status of the aircraft is the aircraft lifting off the ground, and the landing gear controller causes the performance of the first portion immediately after the aircraft lifts off the ground.

5. The aircraft landing gear system of claim 1, wherein the status of the aircraft comprises one or more of: ground speed of the aircraft, amount of lift of the aircraft, aircraft angle, absolute altitude of the aircraft, true altitude of the aircraft, landing gear strut length, and aircraft rotation.

6. An aircraft landing gear system, comprising:
a landing gear;
a landing gear retraction system configured to retract the landing gear;
a landing gear bay door;
a landing gear bay door actuator configured to move the landing gear bay door between a closed position and an open position relative to a door frame;
a landing gear controller configured, during an aircraft take-off procedure, to cause the landing gear retraction system to perform only a first portion of a landing gear retraction process, wherein the landing gear controller responds to a status of the aircraft to cause the performance of the first portion and cause the performance of the first portion before receiving a command to retract the landing gear,
wherein the first portion of the landing gear retraction process includes the landing gear retraction system actuating the landing gear bay door actuator to positively hold the landing gear bay door in the closed position,
wherein the landing gear controller is further configured to cause, during the aircraft take-off procedure, the landing gear retraction system to perform the first portion of the landing gear retraction process when the aircraft is on the ground.

7. An aircraft landing gear system comprising:
a landing gear including a strut, and;
a landing gear retraction system configured to retract the landing gear;
a landing gear bay door;
a landing gear bay door actuator configured to move the landing gear bay door between a closed position and an open position relative to a door frame;
a landing gear controller configured, during an aircraft take-off procedure, to cause the landing gear retraction system to perform only a first portion of a landing gear retraction process, wherein the landing gear controller responds to a status of the aircraft to cause the performance of the first portion and cause the performance of the first portion before receiving a command to retract the landing gear,
wherein the first portion of the landing gear retraction process includes the landing gear retraction system actuating the landing gear bay door actuator to positively hold the landing gear bay door in the closed position, and
wherein the landing gear controller is configured to cause, during the aircraft take-off procedure, the landing gear retraction system to perform the first portion of the landing gear retraction process in response to a detection that a length of the strut has increased, during the aircraft take-off procedure, beyond a predetermined threshold length.

8. The aircraft landing gear system of claim 7, wherein the predetermined threshold length is less than a maximum length to which the strut is extendable when the aircraft is off the ground.

9. The aircraft landing gear system of claim 1, further comprising a landing gear bay door lock configured to retain the landing gear bay door in the closed position when locked,
- wherein the landing gear controller is further configured to cause the landing gear retraction system to perform a second portion of the landing gear retraction process in response to receiving the command to retract the landing gear, and
- wherein the second portion of the landing gear retraction process comprises the landing gear retraction system unlocking the landing gear bay door lock to permit movement of the landing gear bay door from the closed position towards the open position.

10. A method to retract a landing gear of an aircraft including the landing gear, a landing gear retraction system configured to retract the landing gear, a landing gear bay door, a landing gear bay door actuator, and a landing gear controller, the method comprising:
- the landing gear controller, during a take-off procedure of the aircraft and in response to a status of the aircraft, causing the landing gear retraction system to perform only a first portion of a process for retracting the landing gear, wherein the first portion includes actuating the landing gear bay door actuator to positively hold the landing gear bay door in a closed position; and
- the landing gear controller receiving a command for the landing gear to be retracted after causing the performance of the first portion,
- wherein the landing gear bay door actuator positively holds the landing gear bay door in the closed position until at least the command is received.

11. The method of claim 10, further comprising maintaining a closed state of the landing gear bay door until after the landing gear controller receives the command.

12. The method of claim 10, wherein the first portion of the process includes using avionics of the aircraft.

13. The method of claim 10, further comprising the landing gear controller causing the landing gear retraction system to perform a second portion of the landing gear retraction process after receiving the command for the landing gear to be retracted, wherein the second portion of the landing gear retraction process includes the landing gear controller causing the landing gear bay door actuator to move the landing gear bay door from the closed position towards an open position.

14. The method of claim 10, wherein the status of the aircraft is that the aircraft has lifted off the ground, and the landing gear controller causes the performance of the first portion immediately after the aircraft lifts off the ground.

15. The method of claim 10, wherein the status of the aircraft comprises one or more of: ground speed of the aircraft, amount of lift of the aircraft, aircraft angle, absolute altitude of the aircraft, true altitude of the aircraft, landing gear strut length, and aircraft rotation.

16. A method to retract a landing gear of an aircraft including the landing gear, a landing gear retraction system configured to retract the landing gear, a landing gear bay door, a landing gear bay door actuator, and a landing gear controller, the method comprising:
- the landing gear controller, during a take-off procedure of the aircraft and in response to a status of the aircraft, causing the landing gear retraction system to perform only a first portion of a process for retracting the landing gear, wherein the first portion includes actuating the landing gear bay door actuator to positively hold the landing gear bay door in a closed position; and
- the landing gear controller receiving a command for the landing gear to be retracted after causing the performance of the first portion,
- wherein the first portion of the landing gear retraction process is performed while the aircraft is on the ground.

17. The method of claim 10, wherein the landing gear includes a strut, and the status is that that a length of the strut has increased, during the aircraft take-off procedure, beyond a predetermined threshold length.

18. The method of claim 17, wherein the predetermined threshold length is less than a maximum length to which the strut is extendable when the aircraft is off the ground.

19. The method of claim 13, wherein the aircraft includes a landing gear bay door lock, and
- wherein the second portion of the landing gear retraction process comprises the landing gear controller causing unlocking of the landing gear bay door lock to permit movement of the landing gear bay door from the closed position towards the open position.

20. An aircraft comprising the aircraft landing gear system of claim 1.

* * * * *